(12) United States Patent
Shen et al.

(10) Patent No.: US 11,133,030 B1
(45) Date of Patent: Sep. 28, 2021

(54) HARD DRIVE ASSEMBLY WITH ONBOARD TUNED DATA MEMORY

(71) Applicant: Seagate Technology LLC, Fremont, CA (US)

(72) Inventors: Jin Quan Shen, Singapore (SG); Xiong Liu, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/030,116

(22) Filed: Sep. 23, 2020

(51) Int. Cl.
G11B 5/596 (2006.01)
G11B 33/12 (2006.01)

(52) U.S. Cl.
CPC ........ G11B 5/59688 (2013.01); G11B 33/126 (2013.01)

(58) Field of Classification Search
CPC .................................................... G11B 5/596
See application file for complete search history.

(56) References Cited

U.S. PATENT DOCUMENTS

| | | | |
|---|---|---|---|
| 5,396,384 A | 3/1995 | Caldeira et al. | |
| 5,499,161 A * | 3/1996 | Hosseinzadeh | H05K 1/189 361/749 |
| 6,587,300 B1 * | 7/2003 | Dobbek | G11B 19/02 360/71 |
| 7,633,705 B2 * | 12/2009 | Sudo | G11B 5/59627 360/77.04 |
| 8,601,248 B2 * | 12/2013 | Thorsted | G11B 19/2072 713/1 |
| 8,665,550 B1 * | 3/2014 | Sutardja | G11B 5/59627 360/77.04 |
| 9,070,411 B1 | 6/2015 | Ellis et al. | |
| 9,093,083 B1 | 7/2015 | Kim et al. | |
| 9,472,223 B1 | 10/2016 | Mendonsa et al. | |

FOREIGN PATENT DOCUMENTS

| | | |
|---|---|---|
| EP | 1143437 A1 | 3/2000 |
| EP | 081973 B1 | 9/2003 |

* cited by examiner

*Primary Examiner* — K. Wong
(74) *Attorney, Agent, or Firm* — Holzer Patel Drennan (57) ABSTRACT

A hard disk assembly (HDAs) that include a tuning data memory at least including tuning data regarding the HDA. The HDAs may lack an internal disk controller, but rather may communicate the tuning data and/or other HDA-specific data (e.g., firmware, certification data, etc.) to a reader device comprising a disk controller. In this regard, the reader device may coordinate with the HDA once the tuning data is received to operate the HDA to perform TO commands in response to commands received at the reader device from a host. In turn, upon failure of an HDA, a new HDA may be swapped into place to communicate with the reader device. Because the HDAs may lack onboard disk controllers, the cost and complexity of each HDA may be reduced.

20 Claims, 8 Drawing Sheets

HARD DRIVE ASSEMBLY WITH ONBOARD TUNED DATA MEMORY

BACKGROUND

Persistent memory resources are used in a variety of computing systems. The amount of data generated and stored in persistent storage continues to grow. Such persistent memory resources may include hard disk drives (HDDs) that use magnetic storage media to storage a relatively large amount of data. Such HDDs require control systems to control the operation of an HDD. For example, such HDDs may include hardware devices including processors, memory (e.g., DRAM or the like), and other hardware resources used to control operation of the HDD and establish communication with a host device. Such hardware is integrated with the HDD such that the HDD includes both storage media and the control hardware used to read data from and write data to the storage media as a single unit (e.g., within a single enclosure). The hardware resources provided in an HDD add to the overall cost and complexity of an HDD. For example, in the event of an HDD failure (e.g., due to a failure in the magnetic storage media, reader head, actuator, or other component of the HDD), the entire disk drive including the control hardware must be replaced to maintain drive functionality. This adds costs and inefficiencies to the maintenance of a storage system, particularly if a large number of storage drives are utilized and maintained.

SUMMARY

In view of the foregoing, the present disclosure relates to a hard disk assembly (HDA) that is configured to be less costly and complex. The HDA may provide efficiencies in relation to operation and maintenance of storage systems, as will be described in greater detail in the description below.

The (HDA) described herein may include data storage and other resources specific to the HDA to facilitate storage of data on magnetic storage media of the HDA. However, other control and communication functions may be provided by an external reader with which one or more HDAs may be connected. Accordingly, in the event of a failure of an HDA, the failed HDA may be replaced by simply connecting a new HDA to the existing reader rather than having to replace a full HDD that includes the control and communication hardware of the HDD. Because HDAs described herein that do not include the drive control functionality provided by the reader may be less expensive than HDDs, replacement of the HDAs may be less costly. This may provide particular advantages in contexts in which many HDAs are utilized. Moreover, given the lower cost of the HDAs and the fact that a given reader may be equipped to communicate with a plurality of HDAs, more HDAs may be employed in a more efficient manner as compared to HDDs.

The HDA may include magnetic storage media, a read/write head assembly (or simply a "head"), an actuator to move the head assembly relative to the magnetic storage media, and a tuning data memory that includes tuning data specific to the HDA. As such, when the HDA is connected to the reader, the tuning data may be communicated to a drive controller on the card to allow for the drive controller of the reader to control the HDA to read data from and write data to the magnetic storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope of the invention as defined by the claims.

Figure 1:
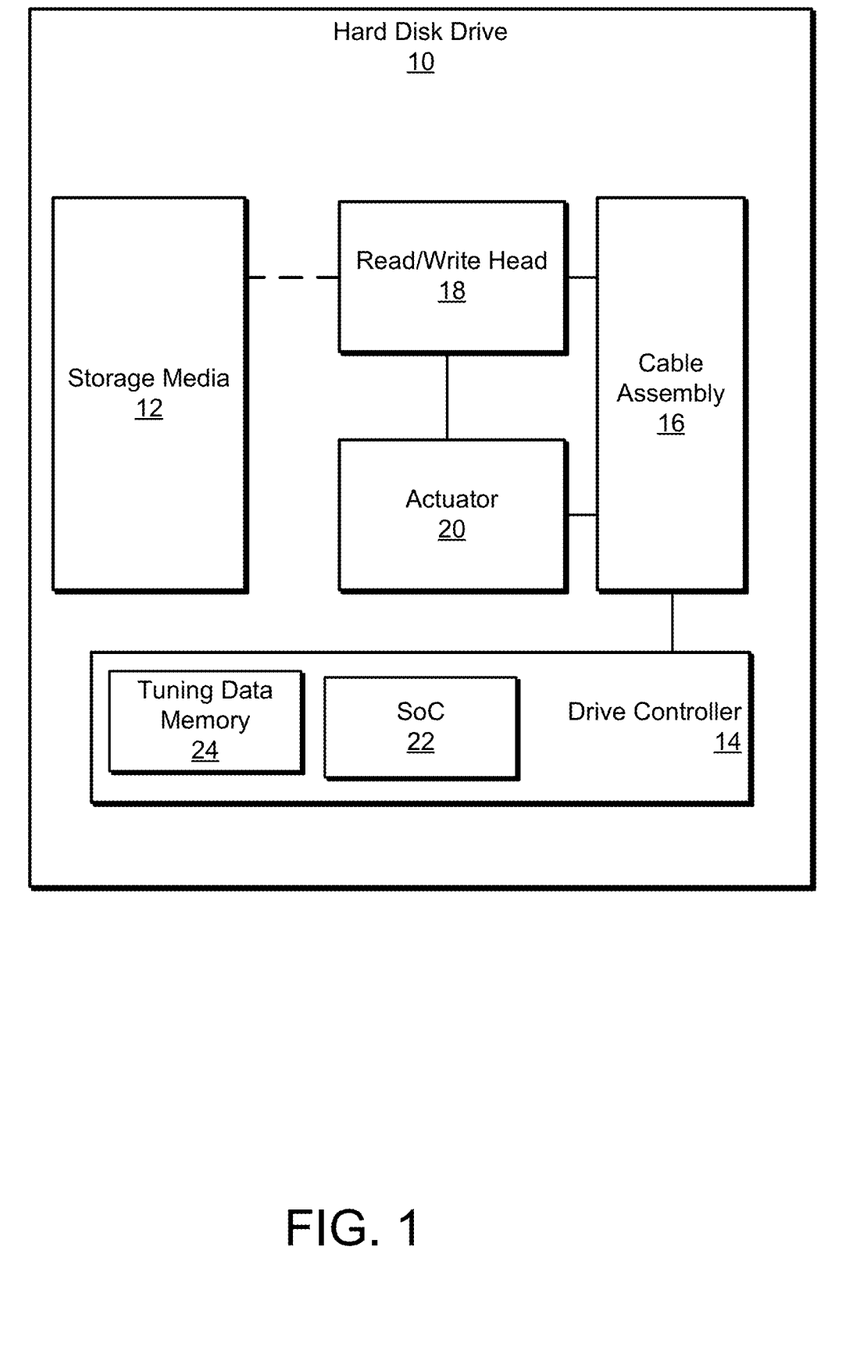
FIG. 1 illustrates an example of an HDD with an internally provided drive controller for control of the functionality of the HDD.

With reference to FIG. 1, an example of an HDD 10 is illustrated. The HDD 10 includes storage media 12, which may include magnetic storage media. The HDD 10 includes a head assembly 18 (or simply "head") that is supported by an actuator 20 relative to the storage media 12. The actuator 20 may be connected to an actuator arm that disposes the head 18 relative to the storage media 12. A cable assembly 16 may be provided that includes electrical pathways or signal lines that establish electrical communication between the head 18 and/or actuator 20 with a drive controller 14. The drive controller 14 may include a SoC 22 that may include hardware including, for example, a processor and memory device operative to control operation of the HDD 10. The drive controller 14 may also include a tuning data memory 24 that includes data specific to the HDD 10, and that is used by the SoC 22 in relation to controlling operation of the HDD 10.

Figure 2:
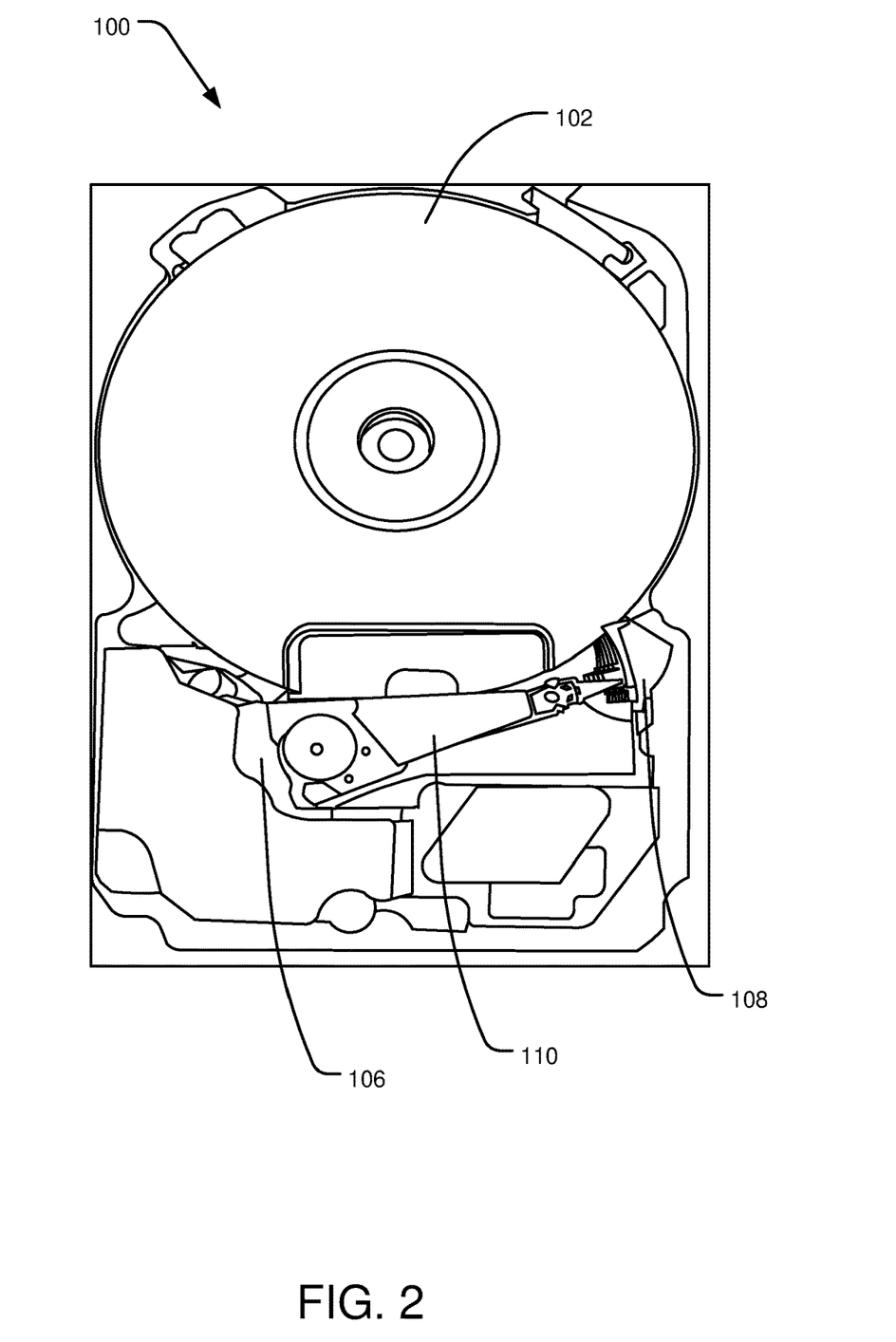
FIG. 2 depicts an example of an HDA shown with an enclosure partially removed to make internal components of the HDA visible.

FIG. 2 includes a depiction of a drive device 100. The drive 100 includes storage media 102, which may comprise magnetic media disks that may be used to storage data. A head 108 is disposed on an actuator 110, which may include an actuator arm. In turn, the drive 100 may include a spindle actuator such as a servo motor or the like to spin the storage media 102 while the actuator 110 is controlled to position the head 108 relative to the storage media 102 to read data from and write data to the storage media 102. A cable assembly 106 (partially seen in FIG. 2) may comprise a flexible printed circuit assembly that includes electrical paths or signal paths to establish electrical communication with the head 108 and/or actuator 110.

With returned reference to FIG. 1, the drive controller 14 is disposed internally to the HDD 10. That is, all the components described above may be provided within a case or enclosure such that the HDD 10 is provided as a unit. As such, upon a failure of the HDD 10, the entire HDD 10 including the storage media 12, head 18, actuator 20, and drive controller 14 must be replaced by providing a new HDD 10. However, it may be appreciated that the fault in an HDD 10 may be related to the storage media 12, head 18, or actuator 20. Thus, replacement of the entire HDD 10 may also include replacement of the drive controller 14 which may include functional components. Moreover, the components of the drive controller 14 may be relatively costly. In turn, replacement of the functional drive controller 14 upon failure of other components of the HDD 10 leads to increased drive and maintenance costs. Especially in storage systems in which many HDDs 10 are utilized, the cost associated with drive replacement may be significant such that efficient replacement of HDDs 10 is a significant advantage.

In turn, it has been proposed herein to provide certain drive control functionality external to a drive assembly such that components that may contribute to failure of a drive may be easily replaced by a new HDA including the potentially failed components without replacement of the drive controller components, which may still be functional. In this regard, HDAs may be less costly and simplified as compared to HDDs. Thus, HDAs may be less costly to replace in the event of an HDA failure. Also, as a plurality of HDAs may be in operative communication with a single reader that includes drive controller functionality, the overall system cost may be reduced.

While advantages are recognized for utilization of HDAs, simply moving the drive controller external to an HDA will not allow for interchangeable operation with a new HDA. Specifically, an HDA may have HDA-specific data that is required for operation of the HDA. This HDA-specific information may include firmware, servo code, and/or tuning data that is specific to the HDA (e.g., specific to the configuration of a given storage media, head, and/or actuator of an HDA including relative interactions between those components).

Figure 3:
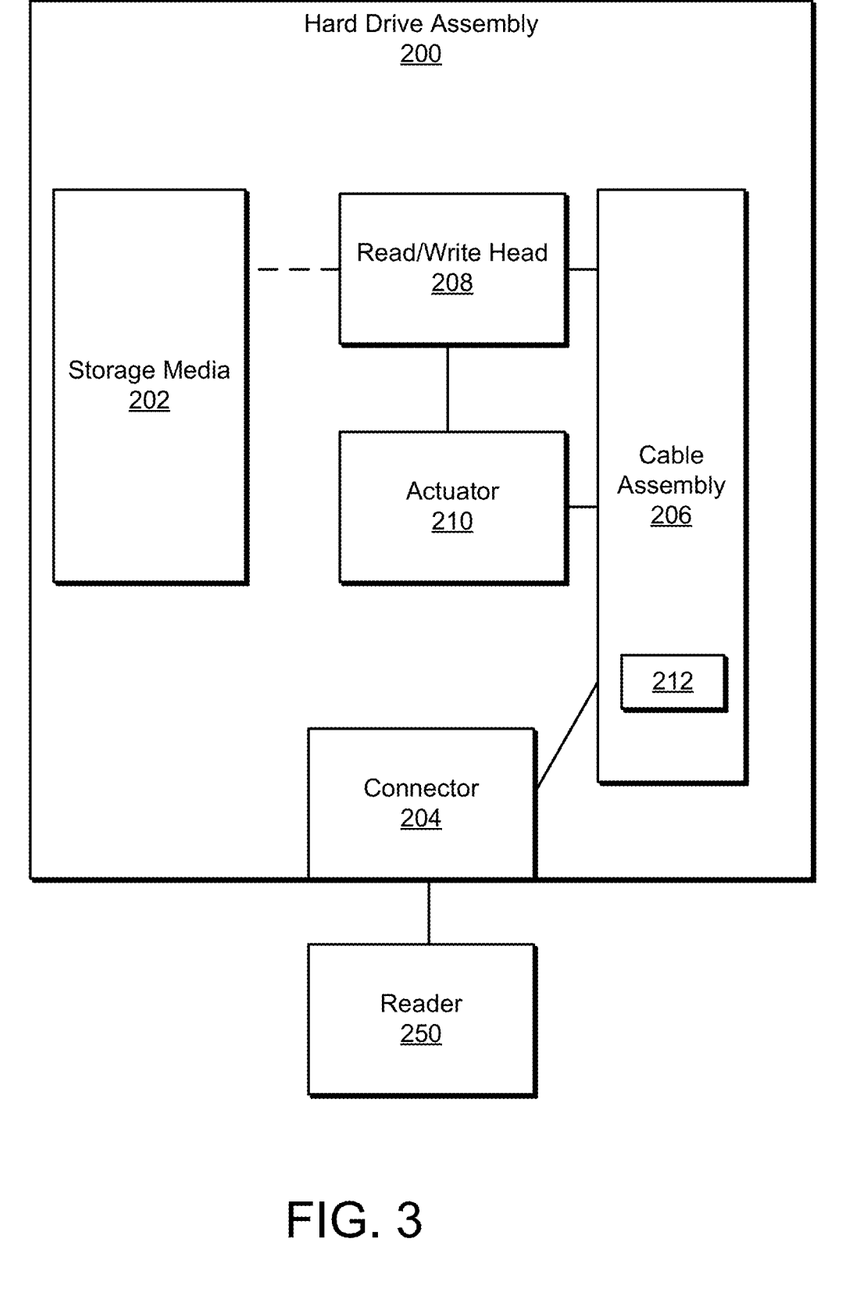
FIG. 3 illustrates an example of an HDA having internal tuning data storage and a connector for establishing operative communication with an external reader.

With further reference to FIG. 3, an example of an HDA 200 is illustrated that may allow for interchangeable operation of an HDA 200 in the event of a failure of an existing HDA 200 in a storage system. Like the HDD 10 illustrated in FIG. 1, the HDA 200 may include storage media 202, a head 208, and an actuator 210. Also, a cable assembly 206 may be provided to establish electrical communication with the head 208 and/or actuator 210. The cable assembly 206 may be a printed circuit assembly that is printed on a flexible substrate to allow for movement of the cable assembly 206 (e.g., to allow movement of the actuator 210).

The HDA 200 may lack an internal drive controller. Rather the HDA 200 may comprise a connector 204 that may be used to establish operative communication between the HDA 200 and an external reader 250. As described in greater detail below, the reader 250 may comprise components of a drive controller to execute drive operations on the HDA 200. In this regard, the drive controller and the HDA 200 controlled by the drive controller may be divorced such that any HDA 200 may be connected to the reader 250 to allow for operation of any one or more HDA 200 connected to the reader 250. In this regard, the HDA 200 may be replaceable as a unit while continuing to maintain functional components of a drive controller provided remotely from the HDA 200 in the reader 250.

However, as described above, an HDA 200 may have HDA-specific tuning data related to the HDA 200 that is required by the reader 250 to properly control the operation of the HDA 200. Thus, simply moving a drive controller of an HDD to a reader 250 would render the HDA 200 inoperable as the HDA-specific tuning data would not be available for an HDA 200 when connected to the reader 250. In turn, the HDA 200 may include a tuning data memory 212 that is internal to the HDA 200 and stores HDA-specific data including, for example, the HDA-specific tuning data.

The HDA-specific data may comprise any data that is unique to the HDA 200. This may include HDA-specific firmware, tuning data, or other information. The tuning data may include Controller Adaptive Parameters (CAP), Read and Write Adaptive Parameters (RAP), and Servo Adaptive Parameters (SAP). CAP may relate to information describing the firmware, world wide name, product family information, and other information needed for proper configuration of firmware of the HDA. RAP may relate to a variety of sub-files utilized for HDA operation. One such example is a Drive Configuration File, which may include information related to capacity, number of head, number of disc, etc. Another example is a Variable Bit Aspect Ratio (VBAR) Configuration File that may provide information related to tracks per inch (TPI) or bits per inch (BPI) for each zone. The RAP may also include a Channel Parameters File that includes information regarding write current, write current overshoot, duration, etc. SAP may relate to servo parameters for the drive including, for example, the repeatable runout of the storage media or the deviation of a servo track from an ideal circular shape (e.g., in a coherent RRO table or the like). This may be specific to the storage media of the HDA and may be measured or otherwise certified for each HDA. The SAP my also include disk offset, reader-writer gap, etc. For example, without correct SAP values, the drive is unlikely to become ready at power up because the servo will be unable to get on track and stay on track.

In one example depicted in FIG. 3, the tuning data memory 212 containing HDA-specific data may be provided on the cable assembly 206 of the HDA 200. While the tuning data memory 212 may be located elsewhere in the HDA 200, providing the tuning data memory 212 on the cable assembly 206 may provide advantages. For example, the cable assembly 206 comprises electrically conductive pathways for establishing communication with the head 208 and/or actuator 210. In this regard, integration of the tuning data memory 212 into the cable assembly 206 may be relatively efficient as the circuit configuration printed on the cable assembly 206 may be easily modified to accommodate the tuning data memory 212. For instance, the cable assembly 206 may include spindle signal lines for establishing operative communication within the HDA 200. Thus, the HDA 200 may be minimally modified to provide the tuning data memory 212 on the cable assembly 206. In turn, operative electrical communication between the tuning data memory 212 and the reader 250 may be provided by the connector 204. In one example, the tuning data memory 212 may be a solid-state memory device such as a NOR-Flash or the like. In turn, the cable assembly 206 may also include NOR-Flash signal lines that may establish operative communication with the tuning data memory 212. Such connectivity to the cable assembly 206 may allow the reader 250 to be in operative communication with the tuning data memory 212 as well as the head 208 and/or actuator 210 of the HDA 200. In turn, rather than requiring multiple connections to different components, locating the tuning data memory 212 on the cable assembly 206 may provide efficient manufacturability, straightforward connectivity, and lower chance for failure of the connection.

Figure 4:
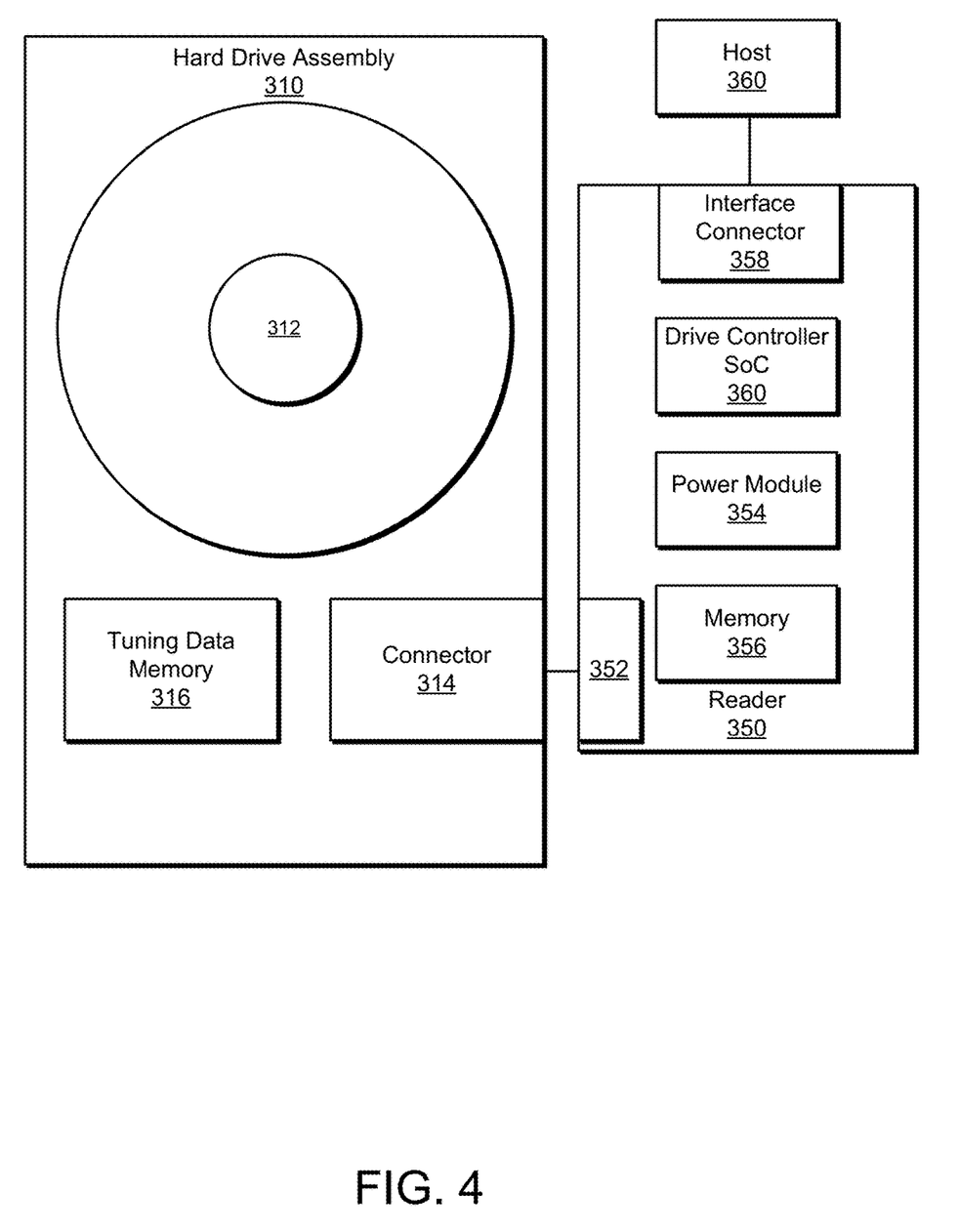
FIG. 4 illustrates an example of an HDA in operative communication with an external reader having a driver controller system-on-chip (SoC) that may receive data from a tuning data memory of the HDA to facilitate control of the HDA by the drive controller.

FIG. 4 illustrates an example of an HDA 310 in operative communication with a reader 350. As described above, the HDA 310 may include storage media 312 and a tuning data memory 316 that includes HDA-specific data including, for example, CAP, RAP, and SAP data specific to the HDA 310 as described above. The HDA 310 also includes a connector 314 to establish operative communication with the reader 350 which may have a corresponding connector 352. The connector 314 and the connector 352 may be connected by way of a cable, plug, or other interface. The connector 314 and/or connector 352 may comprise a proprietary or standardized connector interface.

In FIG. 4, the reader 350 is shown in greater detail. The reader 350 may include a drive controller SoC 360 including, for example, a processor, microcontroller, and/or other hardware comprising the drive controller 360 that may comprise a SoC. The reader 350 may also include a power module 354 that may provide power to the HDA 310 via the connection between connector 352 and the connector 314. The reader 340 may also include a memory 356 that may include data for control of the HDA 310 and/or be programmed with data for use in controlling the HDA 310. For example, the HDA 310 may provide data to the reader 350 from the tuning data memory 316 that may be written to the memory 356. This data may include HDA-specific information such as, for example and without limitation, tuning data, servo code, and/or firmware. The drive controller 360 may access the tuning data that is provided from the tuning data memory 316 for use in controlling the HDA 310. The tuning data may be provided from the HDA 310 via the connector 314 and connector 352. For example, when an HDA 310 is connected to the reader 350, the tuning data may be provided from the tuning data memory 316 to the reader 350 regarding the HDA 310 that is connected to the reader 350. In turn, the drive controller 302 on the reader 350 may be operative to control the HDA 310. The memory 356 may also act as a buffer memory in relation to IO operations to be performed on the HDA 310.

For example reader 350 may also include an interface connector 358 that is in operative communication with a host 360. In this regard, the host 360 may communicate with the reader 350 to issue 110 commands to the HDA 310 for writing data to and reading data from the storage media 312 of the HDA 310. The reader 350 may utilize the tuning data from the HDA 310 to facilitate control of the HDA 310 for completing the I/O commands for the host 360.

In the example shown in FIGS. 3 and 4 illustrate a single HDA in operative communication with a reader 350. However, in other examples, a plurality of HDAs may be connected to a given reader to facilitate control of the plurality of HDAs by the reader. Use of a single reader 350 to provide functionality to a plurality of HDAs may provide operational and cost efficiencies for a storage system utilizing the HDA/reader architecture described herein. For instance, a reader and two HDAs may provide less complexity and cost less than two dedicated HDDs each having independent drive control hardware. Moreover, in the event of a failure of an HDA, the HDA may be replaced at less cost and complexity than a replacement HDD may be provided.

Figure 5:
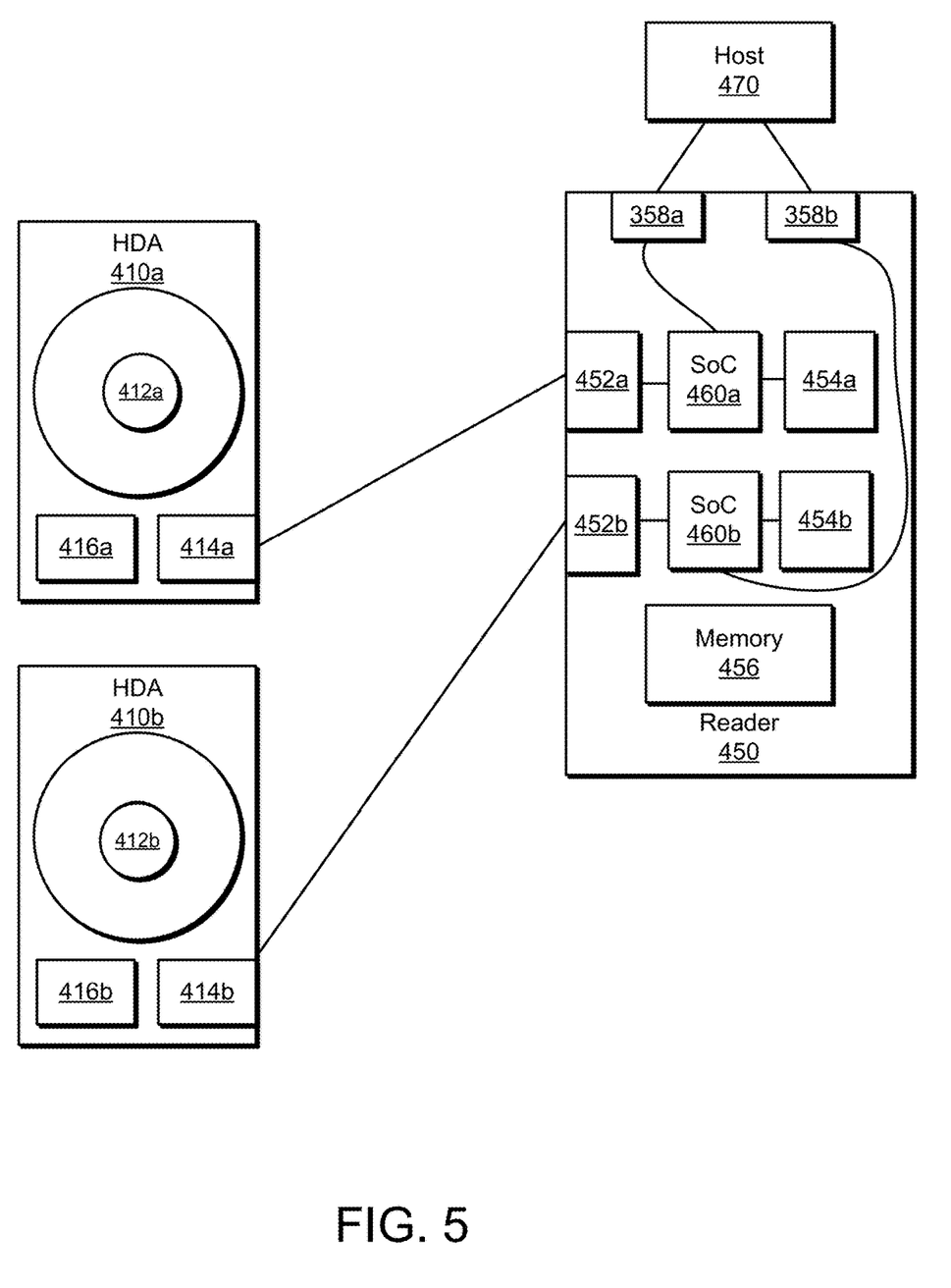
FIG. 5 illustrates an example of an external reader having multiple channels with which a plurality of HDAs may be respectively connected to establish functionality of the plurality of HDAs that each have tuning data for the HDA internally in a tuning data memory.

In FIG. 5 a reader 450 is in operative communication with a first HDA 410a and a second HDA 410b. The reader 450 may include a first channel comprising a first connector 452a, a first drive controller 460a, and a first power module 454a. The first channel may be connected to the first HDA 410a by a connection between the first connector 452a and a connector 414a of the first HDA 410a. In this regard, the first HDA 410a may provide HDA-specific data from a tuning data memory 416a to the drive controller 460a of the first channel to facilitate control of the first HDA 410a by the reader 450. The reader 450 may also have a first interface 358a to present the storage capacity of the HDA 410a to a host 470.

The reader 450 may also include a second channel comprising a second connector 452b, a second drive controller 460b, and a second power module 454b. The second channel may be connected to the second HDA 410b by a connection between the second connector 452b and a connector 414b of the second HDA 410b. In this regard, the second HDA 410b may provide HDA-specific data from a tuning data memory 416b to the drive controller 460b of the second channel to facilitate control of the second HDA 410b by the reader 450. The reader 450 may also have a second interface 358b to present the storage capacity of the HDA 41ba to a host 470. While the reader 450 is shown as presenting both HDAs 410a and HDA 410b to a single host 470, it may be appreciated that the reader 450 may present the different HDAs to different respective hosts.

The reader 450 may include a memory 456. The memory 456 may be used to store data received from the tuning data memory 416a or 416b. Additionally or alternatively, the memory 456 may be used as a buffer memory for 10 operations performed on the HDA 410a or HDA 410b. In this regard, dedicated memories may be provided for each channel or a single memory may be used to buffer data from the various channels of the reader.

Figure 6:
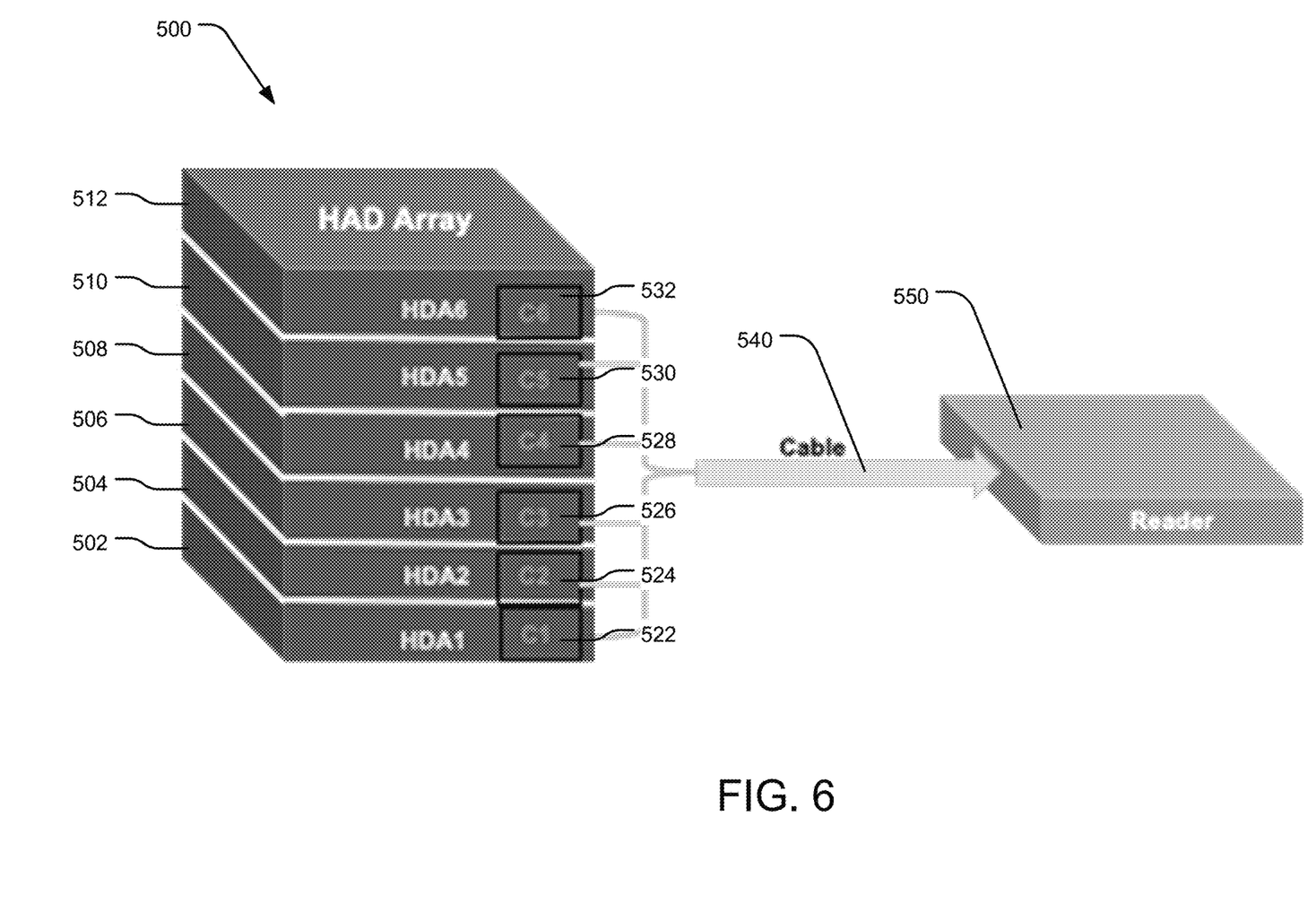
FIG. 6 illustrates an example in which an HDA array is provided with connectors and a cable for establishing operative communication between the HDAs of the HDA array and an external reader.

Also, while two HDAs 410a and 410b are shown in FIG. 5, FIG. 6 further illustrates an HDA array 500 that comprises a plurality of HDAs 502-512. As may be appreciated, each of the HDAs 502, 504, 506, 508, 510, and 512 may each have respective HDA-specific data stored in a tuning data memory in each corresponding HDA. Each HDA 502-512 may also have a corresponding connector 522-532. The connectors 522-532 of the HDA array 500 may be connected to a cable 540 that is also connected to a reader 550. In this regard, the reader 550 may have a corresponding channel for each respective HDA 502-512 of the HDA array.

Figure 7:
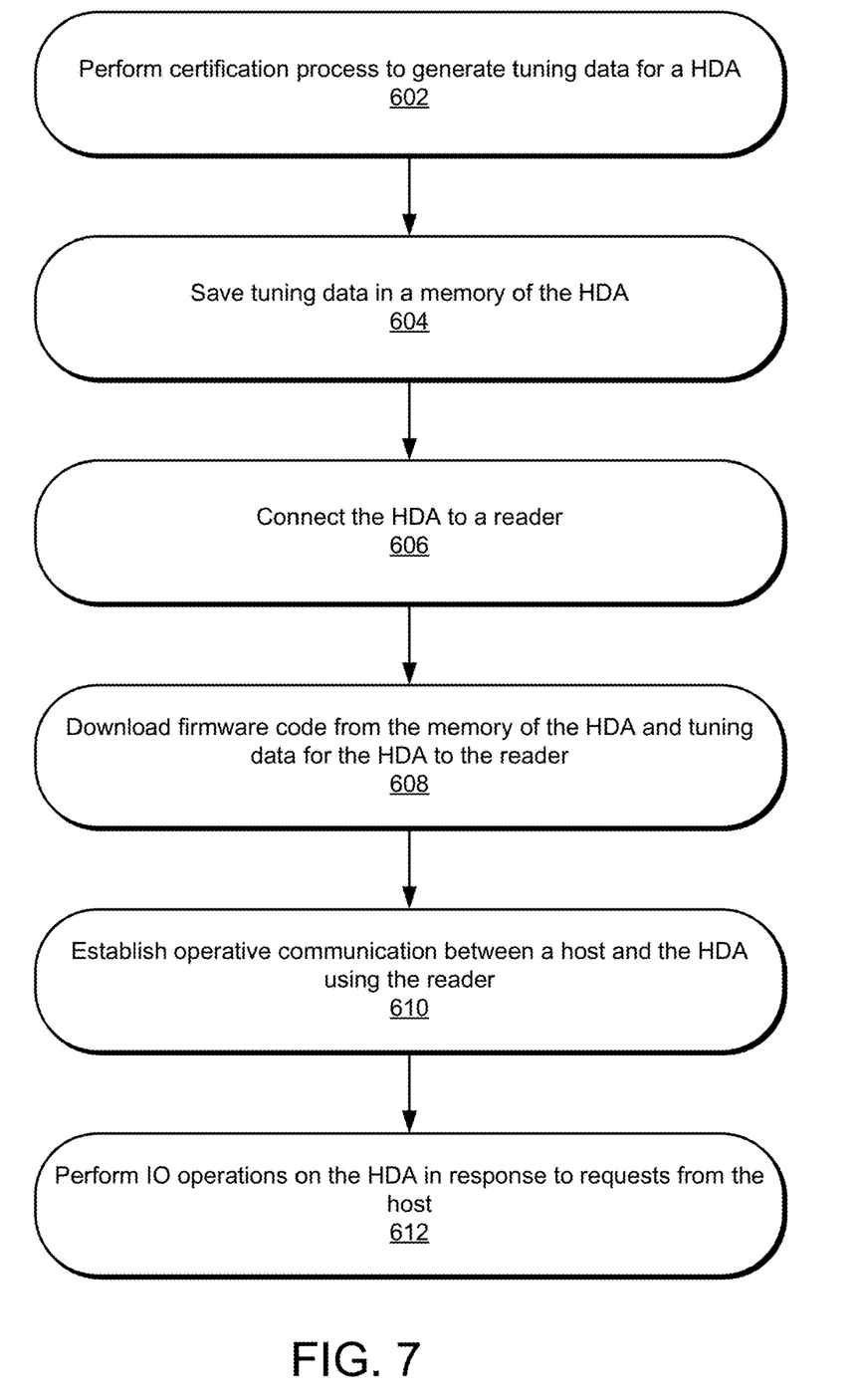
FIG. 7 illustrates example operations for establishing tuning data for an HDA, internal storage of the tuning data for the HDA, and establishing operation of the HDA by connection to an external reader.

FIG. 7 illustrates example operations 600 related to operation of HDAs using a reader external to the HDA. The operations 600 include a generating operation 602 in which a certification process is performed on the HDA to generate the HDA-specific data. The HDA-specific data may be any of the foregoing data described including, for example, CAP, RAP, and SAP information specific to the HDA. The operations 600 also include a saving operation 604 in which the tuning data regarding the HDA is saved in a tuning data memory within the HDA.

In turn, the operations 600 may include a connecting operation 606 in which an HDA is connected to a reader. The connecting operation 606 may include connecting the HDA to the reader using a cable that is engaged with connectors at each of the HDA and the reader, respectively. The operations 600 may also include a downloading operation 608 in which the HDA-specific data is transferred from the tuning data memory within the HDA to the reader. This HDA-specific data may include, for example, tuning data (e.g., CAP, SAP, RAP, etc.), firmware for the HDA, or other HDA-specific data that is required to control operation of the HDA. Once the HDA-specific information is provided to the reader, a communication operation 610 may include establishing operative communication between a host and the HDA by way of the reader. Specifically, a performing operation 612 may include performing IO operations at the HDA (e.g., to read data from or write data to storage media of the HDA) by the reader in response to commands issued from the host.

While the operations 600 of FIG. 7 generally relate to a single HDA, it may be appreciated that the operations 600 may be repeated to provide a plurality of HDAs connected to different respective readers or the same reader to provide an HDA array as described above.

Figure 8:
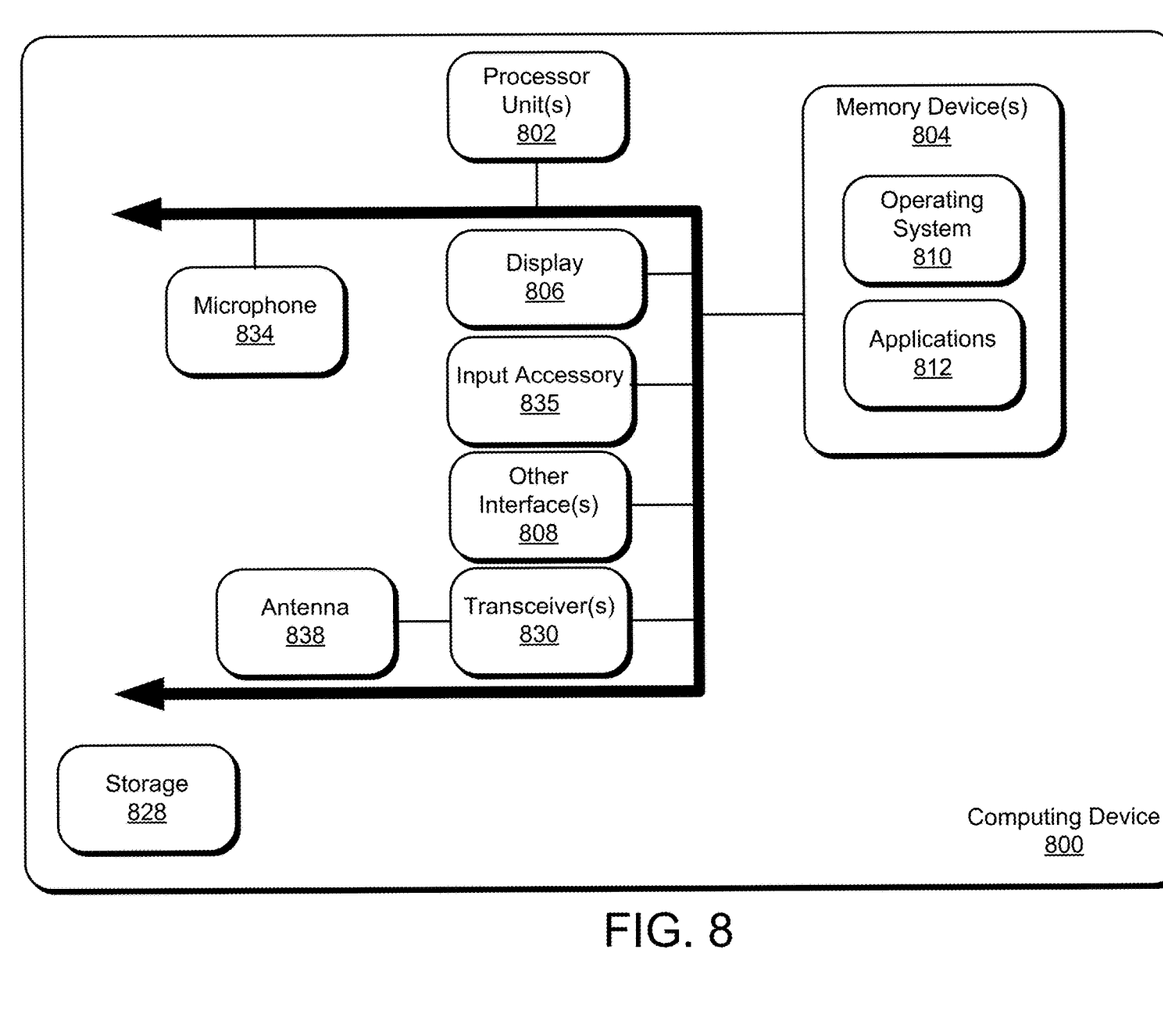
FIG. 8 illustrates a computing device that may be used to realize certain aspects of the present disclosure.

FIG. 8 illustrates an example schematic of a computing device 800 suitable for implementing aspects of the disclosed technology including use as a reader and/or host as described above. The computing device 800 includes one or more processor unit(s) 802, memory 804, a display 806, and other interfaces 808 (e.g., buttons). The memory 804 generally includes both volatile memory (e.g., RAM) and non-volatile memory (e.g., flash memory). An operating system 810, such as the Microsoft Windows® operating system, the Apple macOS operating system, or the Linux operating system, resides in the memory 804 and is executed by the processor unit(s) 802, although it should be understood that other operating systems may be employed.

One or more applications 812 are loaded in the memory 804 and executed on the operating system 810 by the processor unit(s) 802. Applications 812 may receive input from various input local devices such as a microphone 834, input accessory 835 (e.g., keypad, mouse, stylus, touchpad, joystick, instrument mounted input, or the like). Additionally, the applications 812 may receive input from one or more remote devices such as remotely-located smart devices by communicating with such devices over a wired or wireless network using more communication transceivers 830 and an antenna 838 to provide network connectivity (e.g., a mobile phone network, Wi-Fi®, Bluetooth®). The computing device 800 may also include various other components, such as a positioning system (e.g., a global positioning satellite transceiver), one or more accelerometers, one or more cameras, an audio interface (e.g., the microphone 834, an audio amplifier and speaker and/or audio jack), and storage devices 828. Other configurations may also be employed.

The computing device 800 further includes a power supply 816, which is powered by one or more batteries or other power sources and which provides power to other components of the computing device 800. The power supply 816 may also be connected to an external power source (not shown) that overrides or recharges the built-in batteries or other power sources.

In an example implementation, the computing device 800 comprises hardware and/or software embodied by instructions stored in the memory 804 and/or the storage devices 828 and processed by the processor unit(s) 802. The memory 804 may be the memory of a host device or of an accessory that couples to the host. Additionally or alternatively, the computing device 800 may comprise one or more field programmable gate arrays (FGPAs), application specific integrated circuits (ASIC), or other hardware/software/firmware capable of providing the functionality described herein.

The computing device 800 may include a variety of tangible processor-readable storage media and intangible processor-readable communication signals. Tangible processor-readable storage can be embodied by any available media that can be accessed by the computing device 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable highlevel, low-level, object-oriented, visual, compiled and/or interpreted programming language.

One general aspect of the present disclosure includes a hard disk assembly. The hard disk assembly includes storage media configured for non-volatile storage of data. The storage media is engaged with a spindle actuator for rotating the storage media. The hard disk assembly also includes a head assembly configured to read data from and write data to the storage media. An actuator supportably engages the head assembly for movement of the head assembly relative to the storage media. The hard disk assembly also includes a solid-state memory device disposed in the hard disk assembly and comprising tuning data specific to operation of the hard disk assembly. A connector that is in operative communication with the solid-state memory device is provided. The connector is operative to establish a connection with a reader device for communication of the tuning data to the reader device for operation of the hard disk assembly by the reader device to read data from and write data to the storage media.

Implementations may include one or more of the following features. For example, the tuning data may include at least one of read/write adaptive parameters (RAP), controller adaptive parameters (CAP), or servo adaptive parameters (SAP) regarding the hard disk assembly.

In an example, the hard disk assembly includes a cable assembly providing operative communication to the head assembly. The solid-state memory device may be disposed on the cable assembly. The cable assembly may include spindle signal lines and flash signal lines. The flash signal lines may establish operative communication between the connector and the solid-state memory device. The cable assembly may be a printed circuit disposed on a flexible substrate to allow movement with the actuator.

In an example, the solid-state memory device may include firmware for the hard disk assembly.

Another general aspect of the present disclosure includes a hard disk assembly array. The array includes a plurality of hard disk assemblies. Each of the hard disk assemblies includes storage media configured for non-volatile storage of data. The storage media is engaged with a spindle actuator for rotating the storage media. Each hard disk assembly also includes a head assembly configured to read data from and write data to the storage media and an actuator arm supportably engaging the head assembly for movement of the head assembly relative to the storage media. Each hard drive assembly also includes a solid-state memory device disposed in the hard disk assembly and comprising tuning data specific to operation of the hard disk assembly. Each hard disk assembly also includes a connector in operative communication with the solid-state memory device. The array includes a reader device comprising a plurality of channels. Each of the connectors of the plurality of hard disk assemblies is in operative communication with a respective channel of the plurality of channels for communication of the tuning data for a corresponding hard disk assembly to the reader device for operation of the plurality of hard disk arrays by the reader device to read data from and write data to the plurality of hard disk assemblies.

Implementations may include one or more of the following features. For example, the tuning data comprises at least one of adaptive parameters for the hard disk assembly, certification data for the hard disk assembly, or firmware for the hard disk assembly.

In an example, each hard disk assembly includes a cable assembly providing operative communication to the head assembly. The solid-state memory device may be disposed on the cable assembly.

In an example, the reader comprises a shared buffer memory for each of the plurality of hard disk assemblies connected to the reader device. In an example, the plurality of hard disk assemblies are simultaneously operable. Each of the plurality of channels may include a drive controller system-on-chip and a power module for providing power to a hard disk assembly connected to each respective channel of the plurality of channels. The reader device may include an interface connector for each of the plurality of channels for connection with a host to receive commands regarding IO operations to each respective hard disk array connected to the plurality of channels of the reader device.

Another general aspect of the present disclosure includes a method of operation of a hard disk assembly. The method includes establishing communication between a solid-state memory device disposed in the hard disk assembly and a reader device and communicating tuning data from the solid-state memory device specific to operation of the hard disk assembly to the reader device. The method also includes operating the hard disk assembly using the reader device to control a head assembly supported by an actuator arm relative to storage media of the hard disk assembly based on the tuning data received from the solid-state memory device to read data from and write data to the hard disk assembly.

Implementations may include one or more of the following features. For example, the method may include generating tuning data regarding the hard disk assembly. The method may also include storing the tuning data to the solid-state memory device.

In an example, the operating may include executing IO commands received from a host by the reader device at the hard disk assembly.

In an example, the solid-state memory device may be located on a cable assembly establishing operative communication with the head assembly of the hard disk assembly. The method may include storing firmware regarding the hard disk assembly in the solid-state memory device. The method may also include communicating the firmware from the solid-state memory device to the reader.

In an example, the method may include connecting a plurality of hard disk assemblies to the reader device and simultaneously operating the hard disk assemblies using the reader device. Each of the plurality of hard disk assemblies may communicate tuning data to a respective drive controller of the reader device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A hard disk assembly, comprising:
an enclosure;
storage media disposed in the enclosure and configured for non-volatile storage of data, wherein the storage media is engaged with a spindle actuator for rotating the storage media;
a head assembly configured to read data from and write data to the storage media;
an actuator supportably engaging the head assembly for movement of the head assembly relative to the storage media;
a solid-state memory device disposed in the enclosure of the hard disk assembly and comprising tuning data specific to operation of the hard disk assembly; and
a connector in operative communication with the solid-state memory device and operative to establish a connection with a reader device external to the enclosure of the hard disk assembly for communication of the tuning data to the reader device, wherein the reader device comprises a drive controller for controlling operation of the hard disk assembly by the reader device using the tuning data from the solid-state memory device to read data from and write data to the storage media.

2. The hard disk assembly of claim 1, wherein the tuning data comprises at least one of read/write adaptive parameters (RAP), controller adaptive parameters (CAP), or servo adaptive parameters (SAP) regarding the hard disk assembly.

3. The hard disk assembly of claim 1, further comprising:
a cable assembly providing operative communication to the head assembly, wherein the solid-state memory device is disposed on the cable assembly.

4. The hard disk assembly of claim 3, wherein the cable assembly comprises spindle signal lines and flash signal lines, wherein the flash signal lines establish operative communication between the connector and the solid-state memory device.

5. The hard disk assembly of claim 4, wherein the cable assembly comprises a printed circuit disposed on a flexible substrate to allow movement with the actuator.

6. The hard disk assembly of claim 1, wherein the solid-state memory device comprises firmware for the hard disk assembly.

7. A hard disk assembly array, comprising:
a plurality of hard disk assemblies each comprising:
an enclosure;
storage media disposed in the enclosure and configured for non-volatile storage of data, wherein the storage media is engaged with a spindle actuator for rotating the storage media,
a head assembly configured to read data from and write data to the storage media,
an actuator arm supportably engaging the head assembly for movement of the head assembly relative to the storage media,
a solid-state memory device disposed in the enclosure of the hard disk assembly and comprising tuning data specific to operation of the hard disk assembly, and
a connector in operative communication with the solid-state memory device; and
a reader device external to each one of the plurality of hard disk assemblies and comprising a drive controller for control of each of the plurality of hard disk assemblies, the reader device comprising a plurality of channels, wherein each of the connectors of the plurality of hard disk assemblies is in operative communication with a respective channel of the plurality of channels for communication of the tuning data for a corresponding hard disk assembly to the reader device for operation of the respective plurality of hard disk arrays by the reader device to read data from and write data to the plurality of hard disk assemblies.

8. The hard disk assembly array of claim 7, wherein the tuning data comprises at least one of adaptive parameters for the hard disk assembly, certification data for the hard disk assembly, or firmware for the hard disk assembly.

9. The hard disk assembly array of claim 7, wherein each hard disk assembly comprises a cable assembly providing operative communication to the head assembly, wherein the solid-state memory device is disposed on the cable assembly.

10. The hard disk assembly array of claim 7, wherein the reader comprises a shared buffer memory for each of the plurality of hard disk assemblies connected to the reader device.

11. The hard disk assembly array of claim 7, wherein the plurality of hard disk assemblies are simultaneously operable.

12. The hard disk assembly array of claim 7, wherein each of the plurality of channels comprises a drive controller system-on-chip and a power module for providing power to a hard disk assembly connected to each respective channel of the plurality of channels.

13. The hard disk assembly array of claim 7, wherein the reader device comprises an interface connector for each of the plurality of channels for connection with a host to receive commands regarding IO operations to each respective hard disk array connected to the plurality of channels of the reader device.

14. A method of operation of a hard disk assembly comprising:
establishing communication between a solid-state memory device disposed in an enclosure of the hard disk assembly and a reader device external to the enclosure of the hard disk assembly, wherein the reader device comprises a drive controller for controlling operation of the hard disk assembly;
communicating tuning data from the solid-state memory device specific to operation of the hard disk assembly to the reader device; and
operating the hard disk assembly with the reader device to control a head assembly supported by an actuator arm relative to storage media of the hard disk assembly based on the tuning data received from the solid-state memory device to read data from and write data to the hard disk assembly.

15. The method of claim 14, further comprising:
generating tuning data regarding the hard disk assembly; and
storing the tuning data to the solid-state memory device.

16. The method of claim 14, wherein the operating further comprises:
executing IO commands received from a host by the reader device at the hard disk assembly.

17. The method of claim 14, wherein the solid-state memory device is located on a cable assembly establishing operative communication with the head assembly of the hard disk assembly.

18. The method of claim 14, further comprising:
   storing firmware regarding the hard disk assembly in the solid-state memory device; and
   communicating the firmware from the solid-state memory device to the reader.

19. The method of claim 14, further comprising:
   connecting a plurality of hard disk assemblies to the reader device; and
   simultaneously operating the hard disk assemblies using the reader device.

20. The method of claim 19, wherein each of the plurality of hard disk assemblies communicates tuning data to a respective drive controller of the reader device.

* * * * *